United States Patent [19]

Andrew et al.

[11] Patent Number: 5,371,844
[45] Date of Patent: Dec. 6, 1994

[54] PALETTE MANAGER IN A GRAPHICAL USER INTERFACE COMPUTER SYSTEM

[75] Inventors: Christopher Andrew, Boca Raton; Marc A. Bloomfield, Lighthouse Point, both of Fla.

[73] Assignee: International Business Machines Corporation, Armonk, N.Y.

[21] Appl. No.: 855,369

[22] Filed: Mar. 20, 1992

[51] Int. Cl.$^5$ .................................................. G06F 5/06
[52] U.S. Cl. .................................... 395/155; 395/157; 395/161
[58] Field of Search ............... 395/155, 157, 158, 159, 395/161

[56] References Cited

U.S. PATENT DOCUMENTS 5,179,657 1/1993 Dykstal et al. ................ 395/155 X
5,249,263 9/1993 Yanker ............................ 395/155 X

OTHER PUBLICATIONS

Microsoft Windows User's Guide (Trademark of Microsoft Corporation), 1990, pp. 120, 145-153, 156-157.

*Primary Examiner*—Heather R. Herndon
*Assistant Examiner*—Cliff N. Vo
*Attorney, Agent, or Firm*—Robert S. Babayi

[57] ABSTRACT

A method for adjusting elements of a graphical user interface operating system is disclosed. The method includes providing the operating system with a plurality of palette managers; each palette manager includes a plurality of element values. The palette managers are represented on a display device by icons, are accessible via windows and are responsive to a pointer. One of the palette managers is activated via the pointer to provide an activated palette manager window. One of the values of the activated palette manager window is selected via the pointer. The selected value is dragged to an element to be updated and dropped on that element. Dropping the selected value causes the element to be updated to correspond to the selected value.

8 Claims, 17 Drawing Sheets

PALETTE MANAGER IN A GRAPHICAL USER INTERFACE COMPUTER SYSTEM

CROSS-REFERENCE TO RELATED APPLICATIONS

The present patent application is one of a group of copending applications which concern the same overall personal computer system but which individually claim different inventive concepts embodied in such personal computer system. These related patent applications were filed on the same date, namely Aug. 25, 1989, are specifically incorporated by reference herein, and are more particularly described as follows:

(1) application Ser. No. 07/854,171, filed Mar. 20, 1992, and, entitled "Method for Providing Conditional Cascading in a Computer System", the inventors being Bloomfield et al;

(2) application Ser. No. 07/854,257, filed Mar. 20, 1992, and, entitled "Method for Providing Size Adjustment for a Maximized Window in a Computer System Graphical User Interface", the inventor being Bloomfield; and (3) application Ser. No. 07/855,366, filed Mar. 20, 1992, and, entitled "Method for Providing a Readily Distinguishable Template and Means of Duplication Thereof in a Computer System Graphical User Interface", the inventors being Bloomfield et al.

1. Field of the Invention

This invention relates to personal computer systems and in particular to a method and device for improving a graphical user interface (GUI) on a personal computer system.

2. Background of the Invention

Personal computer systems in general and IBM personal computers in particular have attained widespread use for providing computer power to many segments of today's modern society. Personal computer systems can usually be defined as a desktop, floor standing, or portable microcomputer that consists of a system unit having a single system processor, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses.

Examples of such personal computer systems are IBM's PERSONAL COMPUTER AT, IBM's PERSONAL SYSTEM/2 Models 25, 30, 35, 40 SX, 55 SX, 57 SX, 70, 80, 90 and 95, and IBM PERSONAL SYSTEM/1 computers. These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 55 SX through 95. Beginning with the earliest personal computer system of the Family I models, such as the IBM Personal Computer, it was recognized that the operating system would be of utmost importance. Realizing that market acceptance was a primary goal, IBM chose a rather simple text oriented operating system which was suited for the level of hardware technology of the time. The operating system chosen was named DOS which is the acronym for disk operating system. The limited objectives for DOS at the time were non-cryptic commands, English language error messages (instead of error codes, small memory size (12 Kbyte) and reasonable performance. DOS served well for the Family I machines and even into the basic Family II models, but as memory and hardware prices declined and performance increased a more user friendly intuitive operating system was needed. Beginning in 1986, IBM started development of a graphical user interface (GUI) designed to mask the complexity of the hardware technology advances and present to the user an intuitive, flexible, and easy-to-use system. This operating system was named OS/2 and was developed for the more advanced technology of the Family II models.

Additionally, other manufactures have investigated and used other types of GUI systems. One of the earliest in the personal computing area was Xerox's STAR system that presented the user with icons representing a particular operation or software application. Later, Apple's MACINTOSH system added features such as windows and drag and drop to further the intuitive nature of the graphical user interface for Apple's line of computers. Presently, Microsoft's WINDOWS provides a graphical user interface on IBM compatible machines.

With GUI systems, the computer system is controlled using a pointing device such as a mouse. The pointing device controls the location of a pointer that appears on the screen of the computer's display device. Elements on the screen such as icons, which are graphical representations of various modules such as disk drives, applications and documents, or windows, which are rectangular areas on the screen in which applications or documents can be viewed, may be manipulated using the mouse. In this way, the underlying devices which the elements represent may be controlled.

It is known in GUI systems to control the appearance of the elements on the screen. For example, it is possible in the Microsoft's WINDOWS system to globally change the color scheme of the elements appearing on the screen. It is also possible with the WINDOWS system to globally change the colors of certain individual window components, for example, the set the title bar of all windows that are displayed by the system to blue. These changes are accomplished via the WINDOWS Control Panel in which the color or color scheme is chosen and the global change is effected.

As GUI systems developed, producing the underlying elements such as windows and icons has become well known. In fact, publicly available tools such as icon and window editors are now available to actually create the visual display. For example, Conklin, OS/2 Notebook, (Microsoft Press, 1990) pp. 159-255 discusses OS/2 software tools.

SUMMARY OF THE INVENTION

It has been discovered that by providing an operating system with a palette manager which includes a plurality of values and which interacts with other portions of the operating system via a pointing device, the palette manager being controllable via the pointing device, individual elements of the operating system may be quickly and easily modified.

BRIEF DESCRIPTION OF THE DRAWINGS

The foreground aspects and other features of the present invention are explained in the following written description, taken in connection with the accompanying drawings, wherein.

DESCRIPTION OF A PREFERRED EMBODIMENT

The following detailed description is of the best presently contemplated mode for carrying out the invention. This description is not to be taken in a limiting sense but is made merely for the purpose of illustrating the general principles of the invention since the scope of the invention is best defined by the appending claims.

I. Operation of the Computer System

Figure 1:
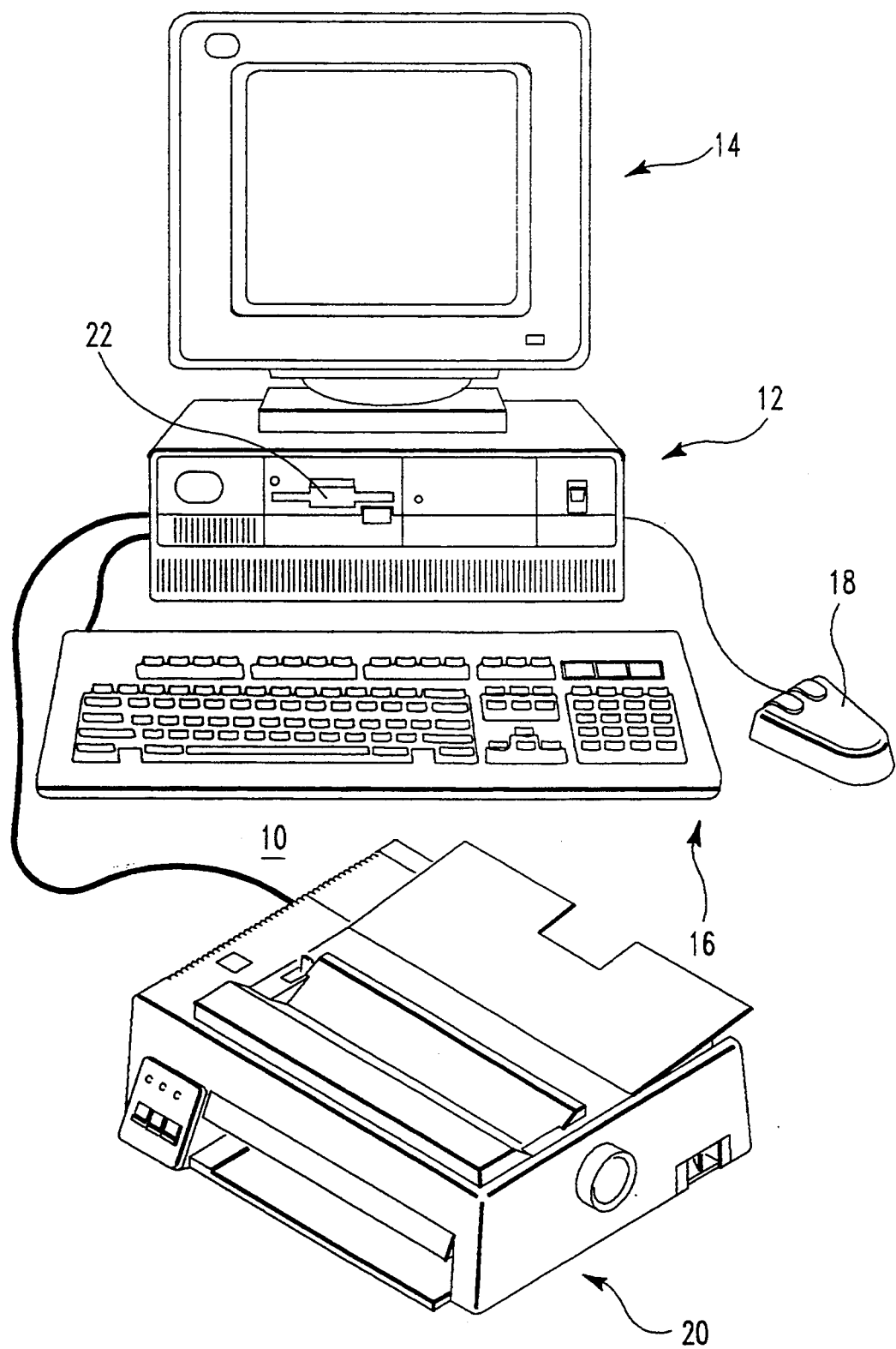
FIG. 1 shows a personal computer system in which the present invention can be employed.

Prior to relating the methodology and structure of the present invention, a summary of the operation in general of a typical personal computer system may merit review. Referring now to the drawings, and in particular to FIG. 1, there is shown a Personal Computer System 10 in which the present invention can be employed. As shown, the Personal Computer System 10 comprises a number of components which are interconnected together. More particularly, a system unit 12 is coupled to and can drive an optional monitor 14 (such as a conventional video display). A system unit 12 can also be optionally coupled to input devices such as a PC keyboard 16 or a mouse 18. Mouse 18 includes right and left buttons (not shown). The left button is generally employed as the main selector button and is alternatively referred to as the first mouse button or mouse button 1. The right button is typically employed to select auxiliary functions as explained later. The right mouse button is alternatively referred to as the second mouse button or mouse button 2. An optional output device such as a printer 20 can also be connected to the system unit 12. Finally the system unit 12 may include one or more mass storage devices such as the diskette drive 22.

As will be described below, the system unit 12 responds to input devices such as the PC keyboard 16, the mouse 18, or local area networking interfaces. Additionally, input/output devices, such as the diskette drive 22, display 14, printer 20, and local area network communication system are connected to the system unit 12 in a manner well known. Of course, those skilled in the art are aware that other conventional components can also be connected to the system unit 12 for interaction therewith. In accordance with the present invention, the computer system 10 includes a system processor that is interconnected to a random access memory (RAM), a read only memory (ROM), and a plurality of I/O devices.

In normal use, the personal computer system can be designed to give independent computing power to a small group of users as a server or a single user and is inexpensively priced for purchase by individuals or small businesses. In operation, the system processor functions under an operating system, such as IBM's OS/2 operating system or DOS. This type of operating system includes a basic input/output system (BIOS) interface between the I/O devices and the operating system. BIOS, which can be stored in a ROM on a motherboard or planar, includes diagnostic routines which are contained in a power on self test section referred to as POST.

Figure 2:
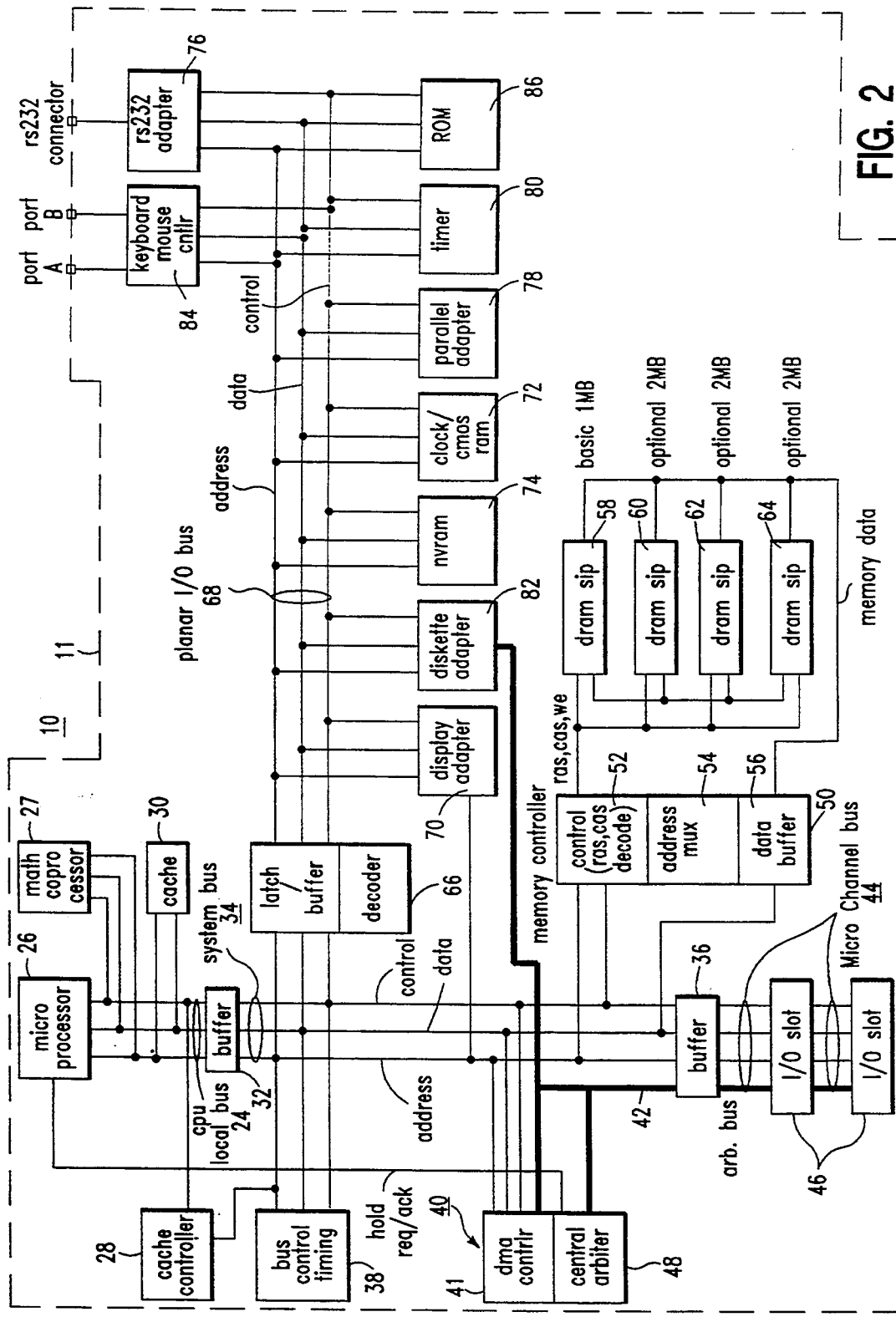
FIG. 2 shows a system block diagram for the personal computer system of FIG. 2.

Referring to FIG. 2, there is shown a block diagram of the Personal Computer System 10 illustrating the various components of the Computer System 10 in accordance with the present invention. FIG. 4 further illustrates components of the planar 11 and the connection of the planar 11 to the I/O slots 46 and other hardware of the Personal Computer System 10. Connected to the planar 11 is the system processor 26 comprised of a microprocessor which is connected by a high speed CPU local bus 24 through a bus controlled timing unit 38 to a memory control unit 50 which is further connected to a volatile random access memory (RAM) 58. While any appropriate microprocessor can be used, one suitable microprocessor is the 80386 which is sold by Intel.

While the present invention is described hereinafter with particular reference to the system block diagram of FIG. 2, it is to be understood at the outset of the description which follows, it is contemplated that the apparatus and methods in accordance with the present invention may be used with other hardware configurations of the planar board. For example, the system processor could be an Intel 80286 or 80486 microprocessor. These particular microprocessors can operate in a real addressing mode or a protected addressing mode. Each mode provides an addressing scheme for accessing different areas of the microprocessor's memory.

Returning now to FIG. 2, the CPU local bus 24 (comprising data, address and control components) provides for the connection of a microprocessor 26, an optional math coprocessor 27, a cache controller 28, and a cache memory 30. Also coupled on the CPU local bus 24 is a buffer 32. The buffer 32 is itself connected to a slower speed (compared to the CPU local bus) system bus 34, also comprising address, data and control components. The system bus 34 extends between the buffer 32 and a further buffer 36. The system bus 34 is further connected to a bus control and timing unit 38 and a DMA unit 40. The DMA unit 40 is comprised of a central arbitration unit 48 and a DMA controller 41. The buffer 36 provides an interface between the system bus 34 and an optional feature bus such as the Micro Channel bus 44. Connected to the bus 44 are a plurality of I/O slots 46 for receiving Micro Channel adapter cards which may be further connected to an I/O device or memory. An arbitration control bus 42 couples the DMA controller 41 and central arbitration unit 48 to the I/O slots 46 and diskette adapter 82. Also connected to system bus 34 is a memory control unit 50 which is comprised of a memory controller 52, an address multiplexer 54, and a data buffer 56. The memory control unit 50 is further connected to a random access memory as represented by the RAM module 58. The memory controller 52 includes the logic for mapping addresses to and from the microprocessor 26 to particular areas of RAM 58. While the microcomputer system 10 is shown with a basic 1 megabyte RAM module, it is understood that additional memory can be interconnected as represented in FIG. 2 by the optional memory modules 60 through 64.

A further buffer 66 is coupled between the system bus 34 and a planar I/O bus 68. The planar I/O bus 68 includes address, data, and control components respectively. Coupled along the planar bus 68 are a variety of I/O adapters and other peripheral components such as the display adapter 70 (which is used to drive an optional display 14), a clock 72, nonvolatile RAM 74 (hereinafter referred to as NVRAM), a RS232 adapter 76, a parallel adapter 78, a plurality of timers 80, a diskette adapter 82, a PC keyboard/mouse controller 84, and a read only memory (ROM) 86. The ROM 86 includes BIOS which provides the user transparent communications between many I/O devices.

The clock 72 is used for time of day calculations. NVRAM 74 is used to store system configuration data. That is, the NVRAM will contain values which describe the present configuration of the system. For example, NVRAM contains information which describe the capacity of a fixed disk or diskette, the type of display, the amount of memory, etc. Of particular importance, NVRAM will contain data which is used to describe the system console configuration; i.e. whether the PC keyboard is connected to the keyboard/mouse controller 84, a display controller is available or the ASCII terminal is connected to the RS232 adapter 76. Furthermore, these data are stored in NVRAM whenever a special configuration program is executed. The purpose of the configuration program is to store values characterizing the configuration of this system to NVRAM which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector. An optional ASCII terminal can be coupled to the system through this connector.

III. OS/2 Version 2 Operating System

Figure 3:
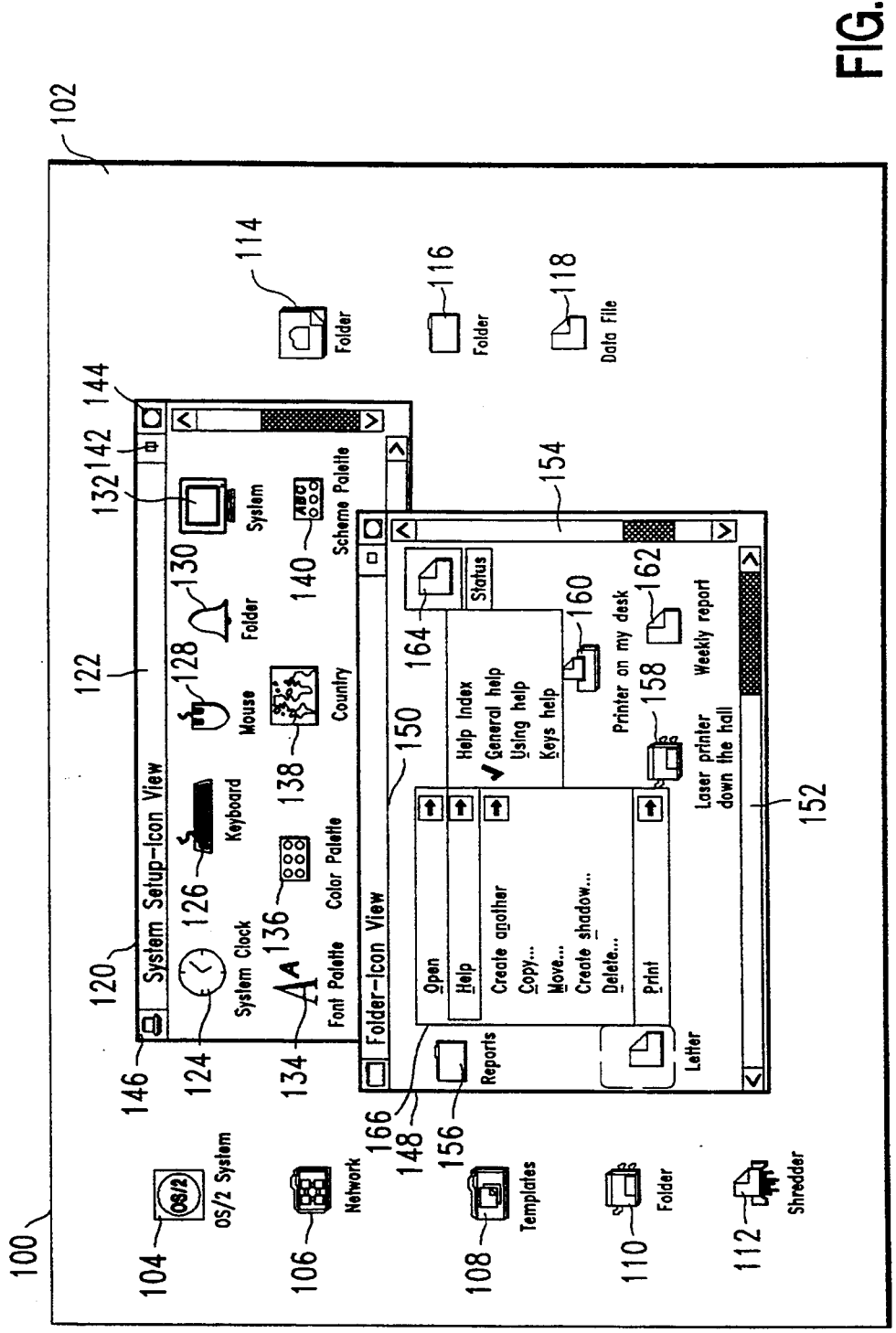
FIG. 3 is a screen representation of the desktop employed in the present invention.

Referring to FIG. 3, a typical display screen 100 which appears when using the OS/2 2.0 operating system is shown. The viewing area within screen 100 is referred to as desktop 102. Desktop 102 includes a plurality of elements such as user selectable icons which are conveniently selected by double clicking the left button of the mouse. Each icon represents an application, function or file storage area which the user can select. For example, as seen in FIG. 3, desktop 102 includes an OS/2 System icon 104, a Network icon 106, a Templates icon 108, a Printer icon 110, a Shredder icon 112, a Folder icon 114, another Folder icon 116 and a Data file 118.

When the user selects an icon by double clicking the same, the corresponding function is activated and the icon becomes highlighted. For example, when the OS/2 System icon 104 is selected on desktop 102, OS/2 System icon 104 becomes highlighted as illustrated in FIG. 3. When OS/2 System icon 102 is so selected, a corresponding window 120 of further possible selections is displayed on desktop 102. More specifically, window 120 includes a title bar 122 in which the name of the selected window is designated in text as "System Setup—Icon View". In this particular example, the selectable icons appearing within System Startup window 120 includes a System Clock icon 124, a Keyboard icon 126, a Mouse icon 128, a Sound icon 130, a System icon 132, a Font Palette icon 134, a Color Palette icon 136, a Country icon 138 and Scheme Palette icon 140.

The upper right corner of window 120 includes a small box 142 which, if selected by the user, minimizes window 120, thus dismissing window 120 and returning window 120 to the icon 104 representation thereof. The upper right corner of window 120 also includes a box 144, larger than box 142 and which if selected by the user, maximizes window 120, thus causing window 120 to occupy substantially all of desktop 102.

The icon representation 146 appearing in the upper left corner indicates the type of window to which it corresponds. For example, window 120 is a system setup window; accordingly, the icon appearing in the upper left corner of window 120 is representative of the System icon. Had system clock icon 124 been selected, the icon appearing in the upper left corner of its window would be representative of a clock.

Since title bar 122 of window 120 is depicted in white or "not-highlighted", this indicates the window 120 is not presently selected or active. Rather, the user has clicked on and selected Folder 114 as indicated by its highlighted nature. When Folder 114 was so selected, a corresponding Folder window 148 was opened on desktop 102 in overlapping fashion with respect to the earlier opened System Setup window 120. The title bar 150 of window 148 indicates the title of window 148 as being "Folder-Icon View". It is noted that title bar 150 of window 148 is highlighted, thus indicating that window 148 is presently the active window. Note that the icon in the upper left corner of window 148 represents a folder, indicating that this window contains folders.

Window 148 includes a horizontal scroll bar 152 which can be engaged by the user to scroll through the contents of window 148 from left to right and from right to left all within the particular viewing area defined by the chosen dimensions of window 148. Window 148 also includes a vertical scroll bar for scrolling through the window contents vertically. Other windows generated by the operating system also include this feature. For purposes of example, window 148 includes a Reports icon 156, a Laser Printer Down The Hall icon 158, a Printer On My Desk icon 160, a Weekly Report icon 162 and a Status icon 164.

When the user selects the word open by clicking on the word "Open" in main menu 166, the function or application associated with the presently selected icon is launched.

One way to select and activate the function or application represented by a particular icon is to single click the left mouse button on that icon. This action causes a main menu such as menu 166 to appear on the screen.

Font Palette icon 134, color palette icon 136 and scheme palette icon 140 are representative of a font palette manager, a color palette manager and a scheme palette manager, respectively. The font palette manager, color palette manager and scheme palette manager are examples of palette managers. A palette manager is the means by which a user may control and adjust desktop parameters by using control panel type windows. For example, the font palette manager is the means by which a user can adjust the fonts that are used by different elements of the desktop. The operating system may contain any number of palette managers.

Each palette manager includes a plurality of cells, each cell corresponding to a value, i.e., a desktop parameter. For example, the color palette manager contains a plurality of cells having different color values, each color value corresponds to a color which may be used to adjust elements of the desktop. Because the palette managers are operating system oriented and interact with other portions of the operating system, use of the palette managers are not tied to particular applications or windows, but are available as general use tools by any or all windows or applications. The palette managers may be used to set system attributes on a per window or per window component basis as well as on a global basis. The use of values is discussed in Bernath et al., "Value Set Control: Selecting Graphical Information", *IBM Personal Systems Developer*, No. 1, 1992, pp 27-34, which is hereby incorporated by reference.

Referring to FIGS. 4a-4d, examples of the font palette manager are shown. The font palette manager allows any font, point size or style, which is supported by the system (i.e., for which the system has a driver) to be quickly and easily applied or updated using a mouse-only drag and drop action. Font palette manager also allows a font to be directly applied to individual windows, as well as individual components of windows, and thus allows non-global font changes.

Figure 4A:
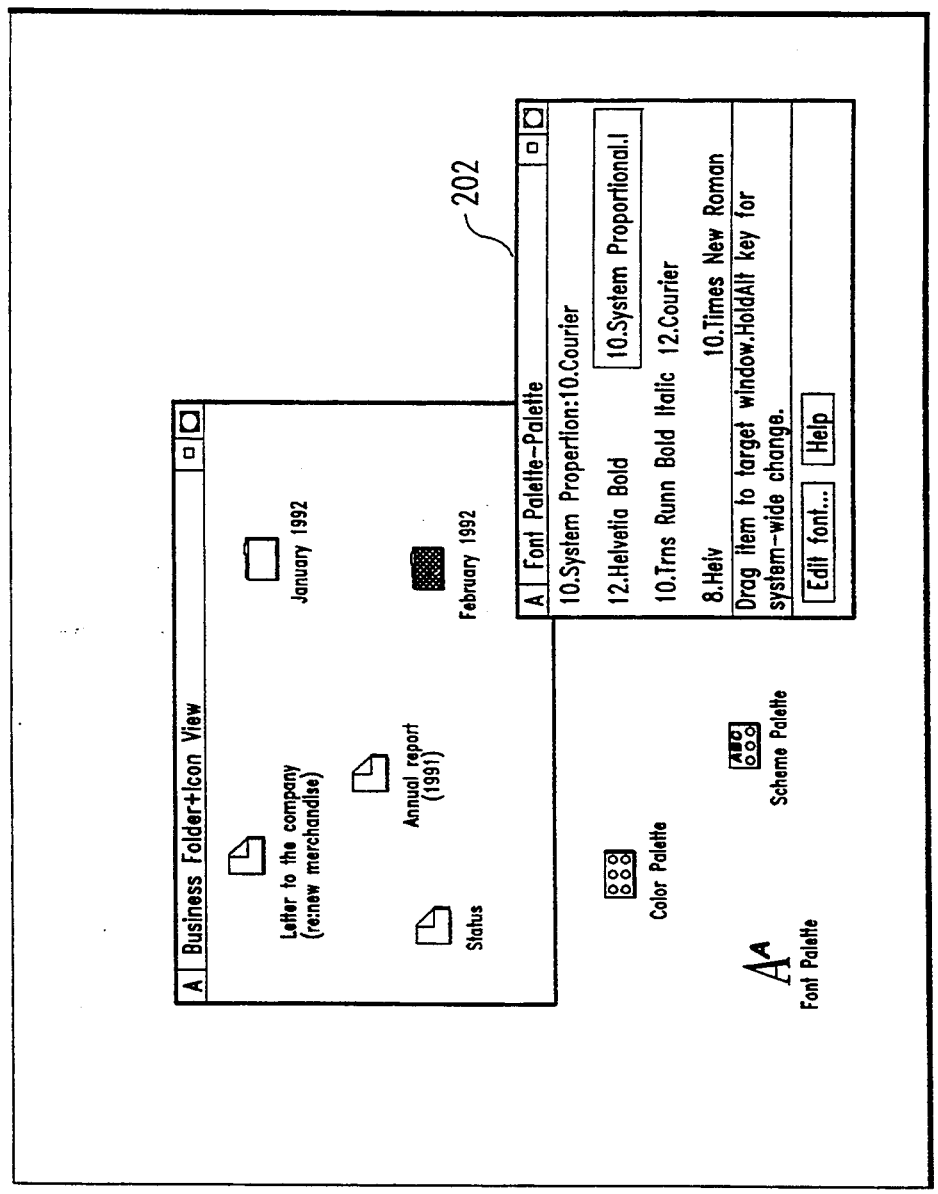
FIGS. 4a–4d are screen representations of a font palette manager in accordance with the present invention.

In FIG. 4a, when font palette icon 134 is selected from system setup window 120 an open font palette window 202 is displayed. The font palette manager includes a plurality of cells which are displayed when font palette window 202 is open. These cells represent different font, point size or style options which may be used when manipulating characters. The cell entitled "10.System Proportional.Italic" is highlighted and thus selected. The title of this cell is displayed in the system proportional font with the italic style and a point size of 10; thus, the title displays the values of the cell.

Figure 4B:
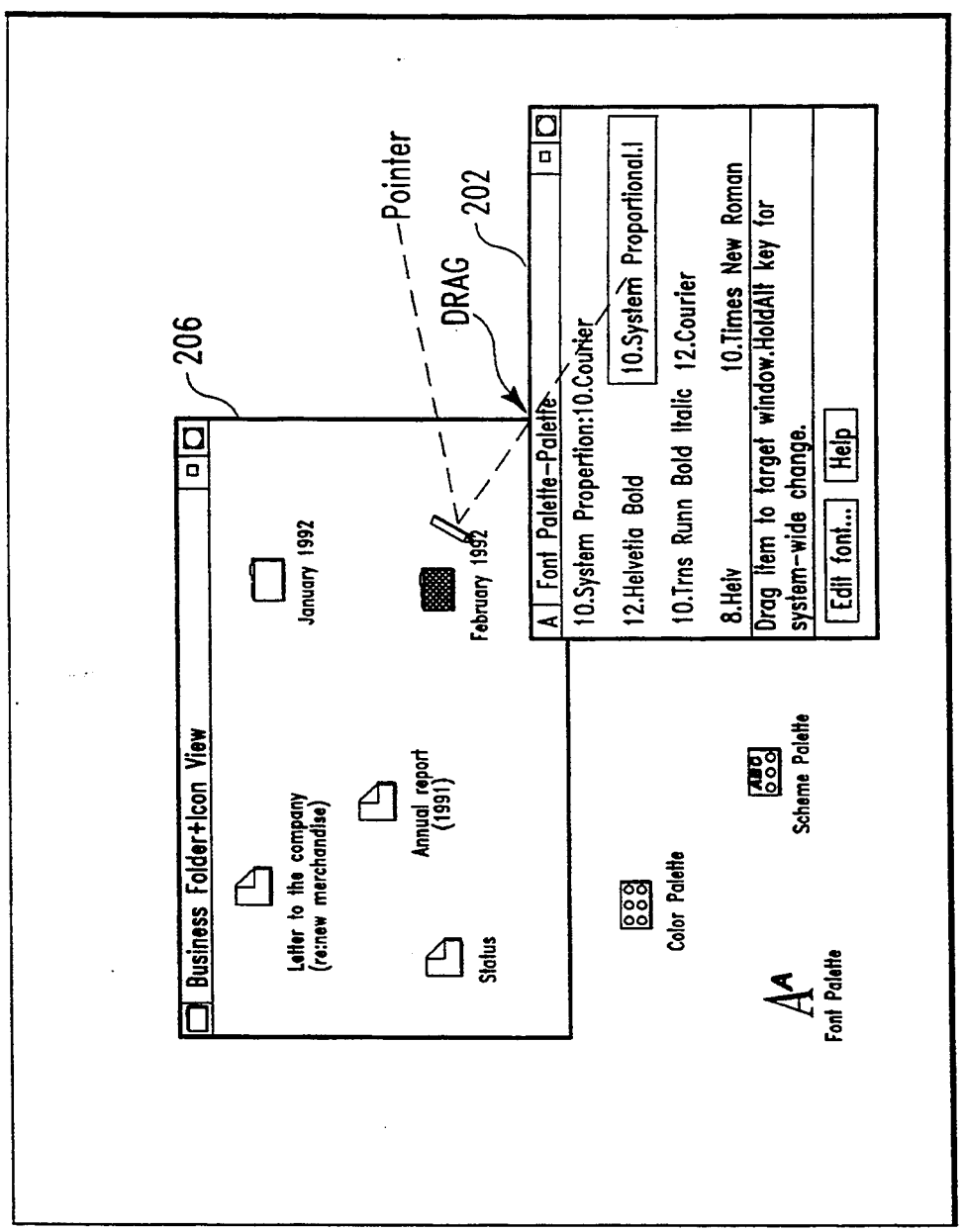

FIG. 4b shows the results of using the font palette. Note that the icon text of the objects in Business Folder window 206 have the value and are represented in the system proportional font with the italic style and a point size of 10. This change was accomplished when the "10.System Proportional.Italic" value was dragged by activating the pointer on this cell (e.g., by clicking a mouse button while the pointer was positioned over the selected cell). While the drag was in progress, the pointer had the representation of a pencil to indicate that a font value was to be applied. The font value was dropped on Business Folder window 206 by releasing the mouse button while the pointer was positioned over Business Folder window 206. When the mouse button was released, the pointer was restored and the text in the target window, Business Folder window 206 in this case, assumed the value of the font "10.System Proportional.Italic".

Figure 4C:
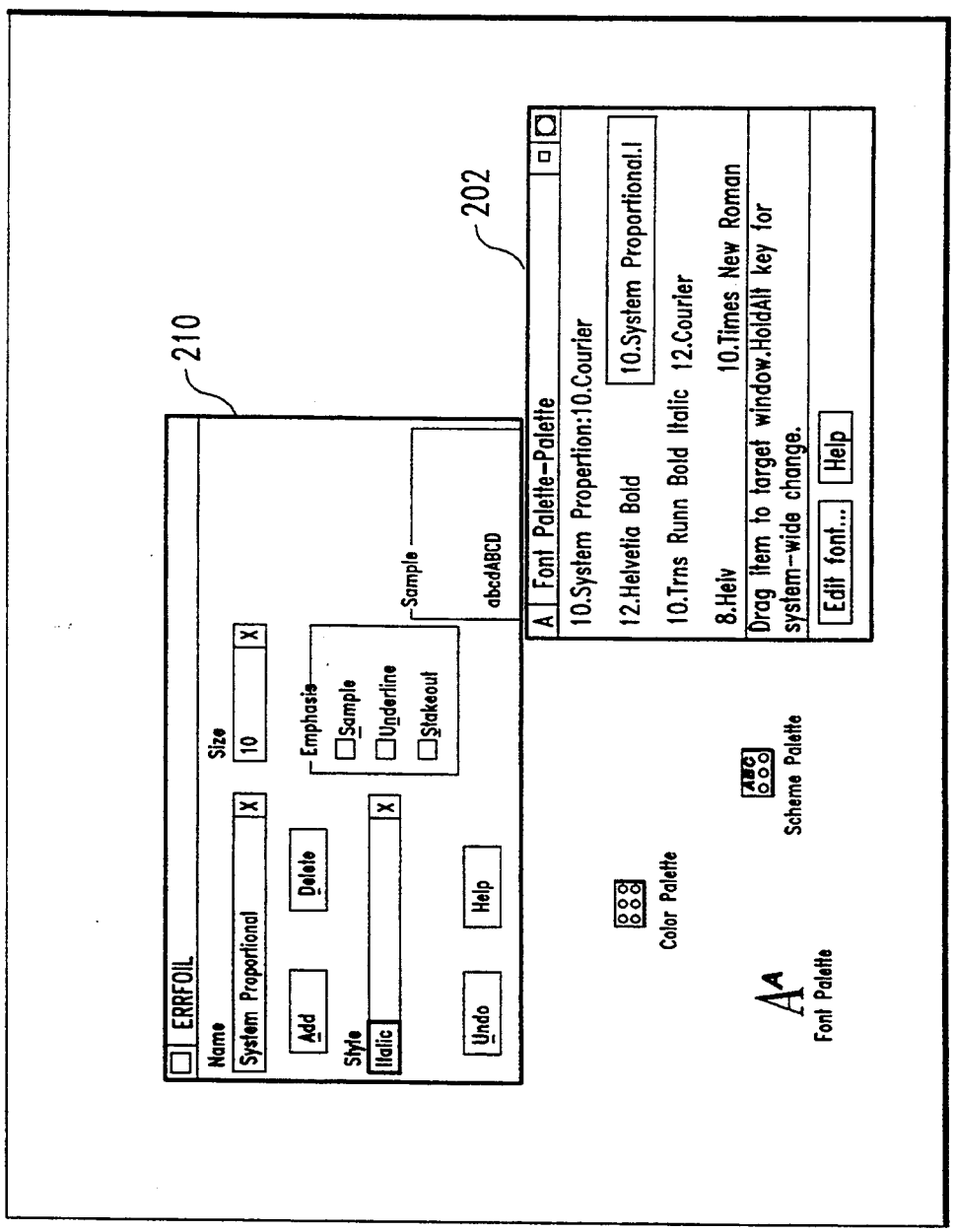

In FIG. 4c, font edit window 210 for the selected cell is shown. When selected by activating the edit font button, font edit window 210 is prefilled with all of the attributes of the font value for the selected cell, in this case the "10.System Proportional.Italic" cell.

Figure 4D:
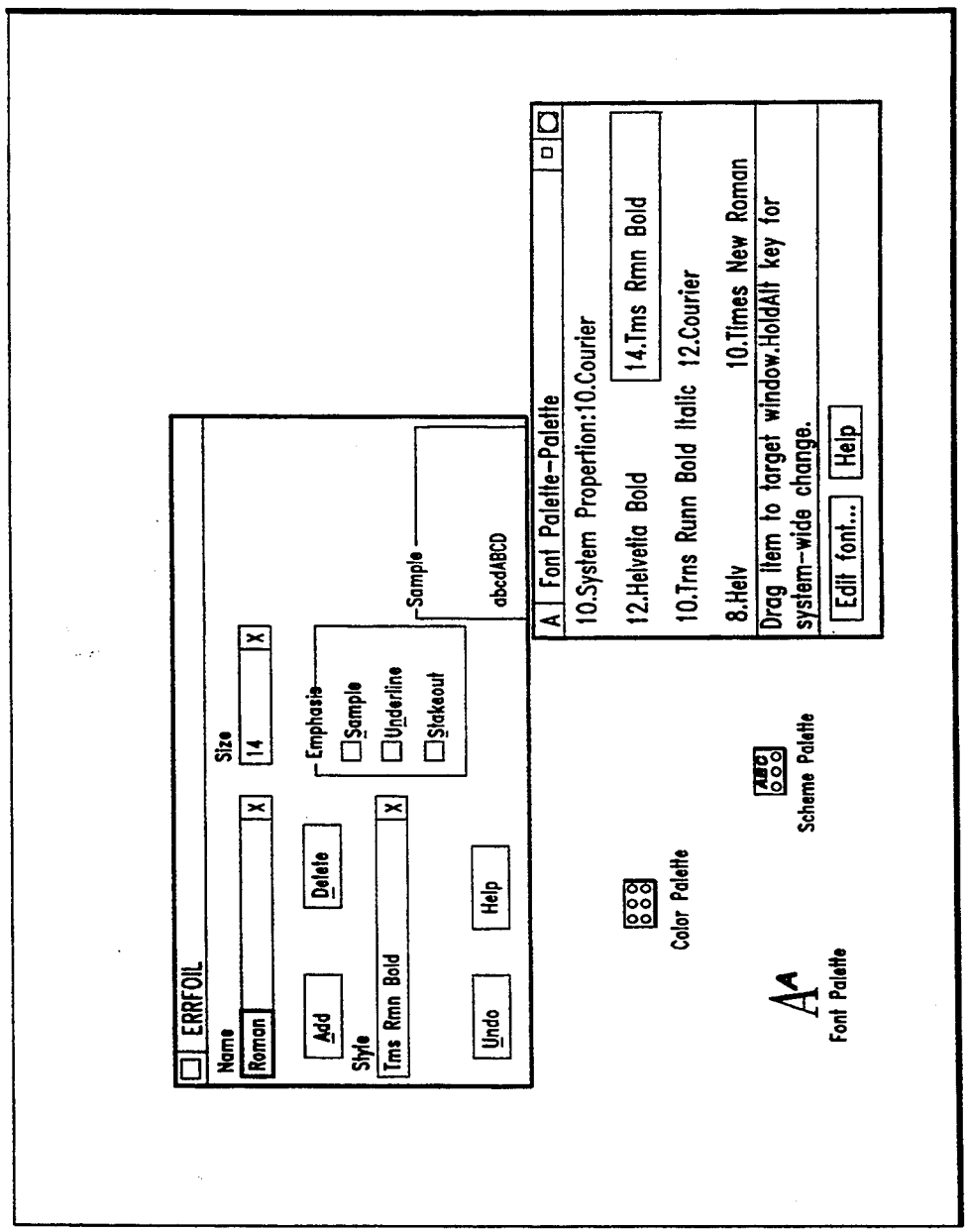

In FIG. 4d, font edit window 210 is shown with the text values altered. As the text values are altered, the text as displayed in display sample 212 are dynamically altered; additionally, the attributes of the selected cell of font palette window 202 are also dynamically altered.

Referring to FIGS. 5a-5d, examples of the functions of the color palette manager are shown. The color palette manager allows any color, either solid or dithered, which is supported by display 14 and display adapter 70, to be quickly and easily applied using a mouse-only drag and drop action. The color palette manager also allows a color to be directly applied to individual windows or individual components of windows and thus allows non-global color changes.

Figure 5A:
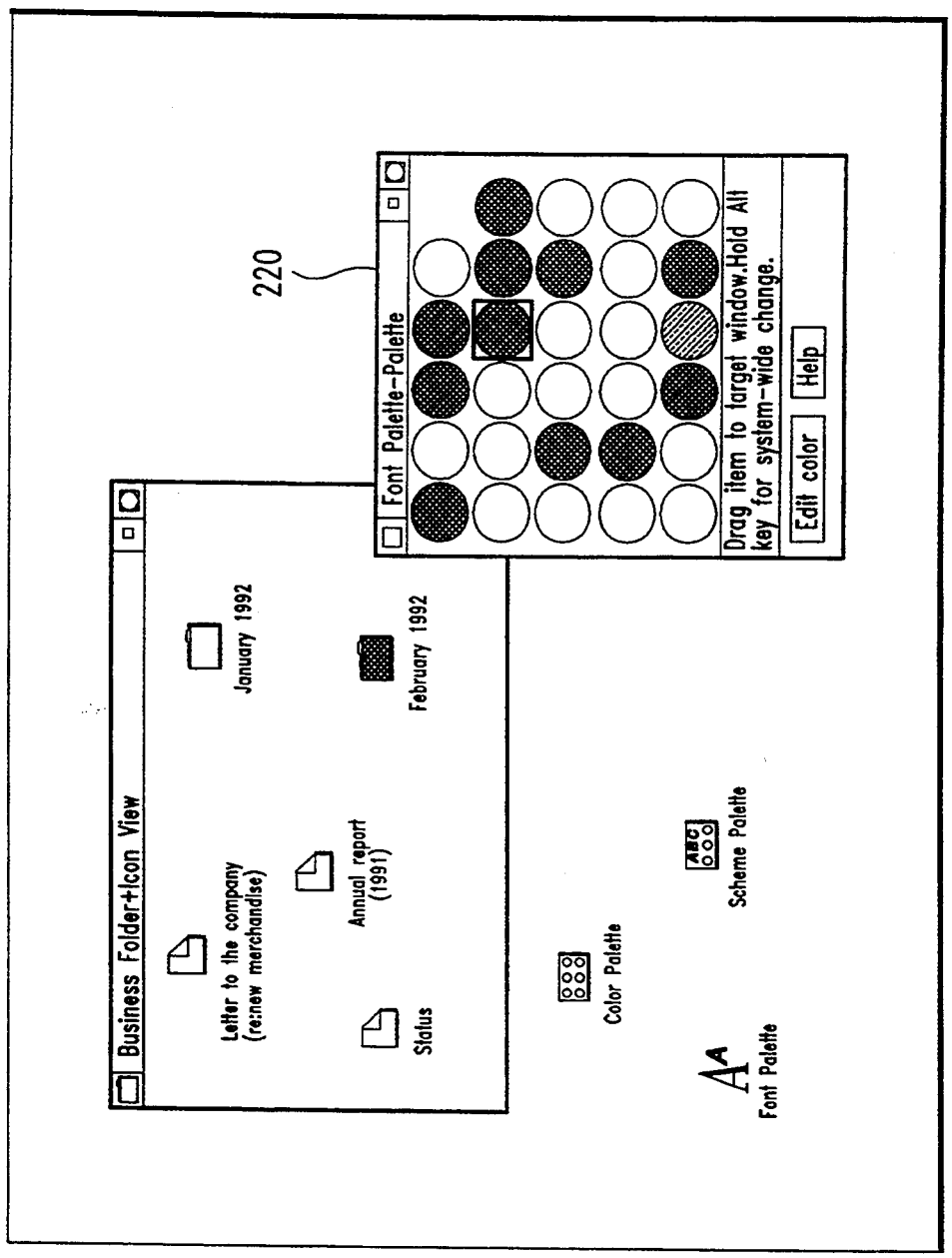
FIGS. 5a–5d are screen representations of a color palette manager in accordance with the present invention.

In FIG. 5a, when color palette icon 136 is selected from system setup window 120, an open color palette window 220 is displayed. The color palette manager includes a plurality of color cells which are displayed when color palette window 220 is open. These cells represent different colors which may be used when manipulating windows or individual components of windows. FIG. 5a shows the cell located in the second row, fourth column of color palette window 220 selected.

Figure 5B:
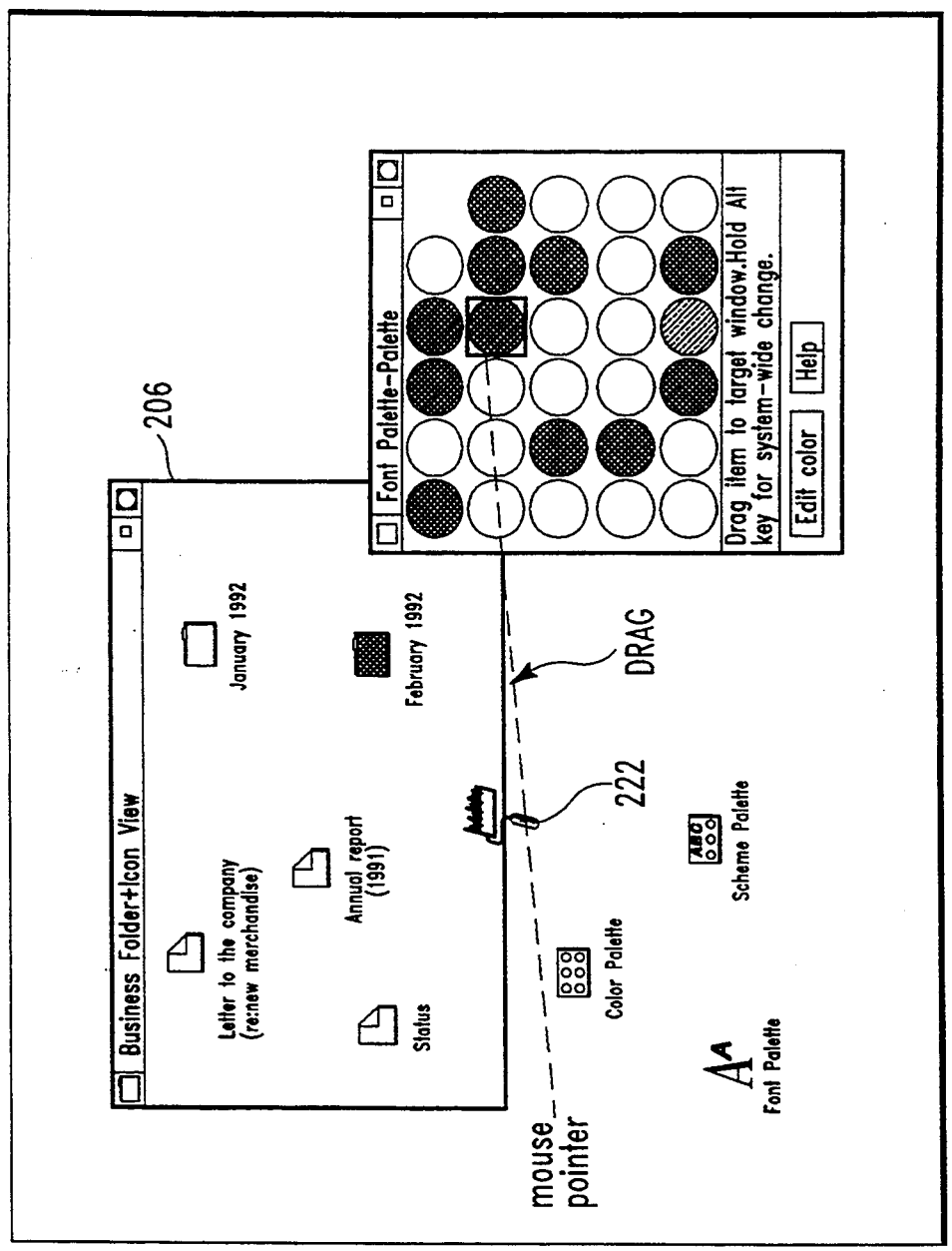

FIG. 5b shows the result of using the color palette. Note that the color of the background of Business Folder window 206 now corresponds to the color of the selected color cell of color palette window 220. This change was accomplished when the cell was selected and dragged over the background of Business Folder window 206. While the drag was in progress, the pointer has the representation of paint roller 222; the color of the roller portion of paint roller 222 corresponds to the color of the selected cell. Accordingly, while the pointer is being dragged, a user can determine what color the window or individual component of the window will be. When the mouse button was released, the pointer was restored to an arrow and the target window, in this case the background of Business Folder window 206, assumed the value of the color that was dropped by the paint roller.

Figure 5C:
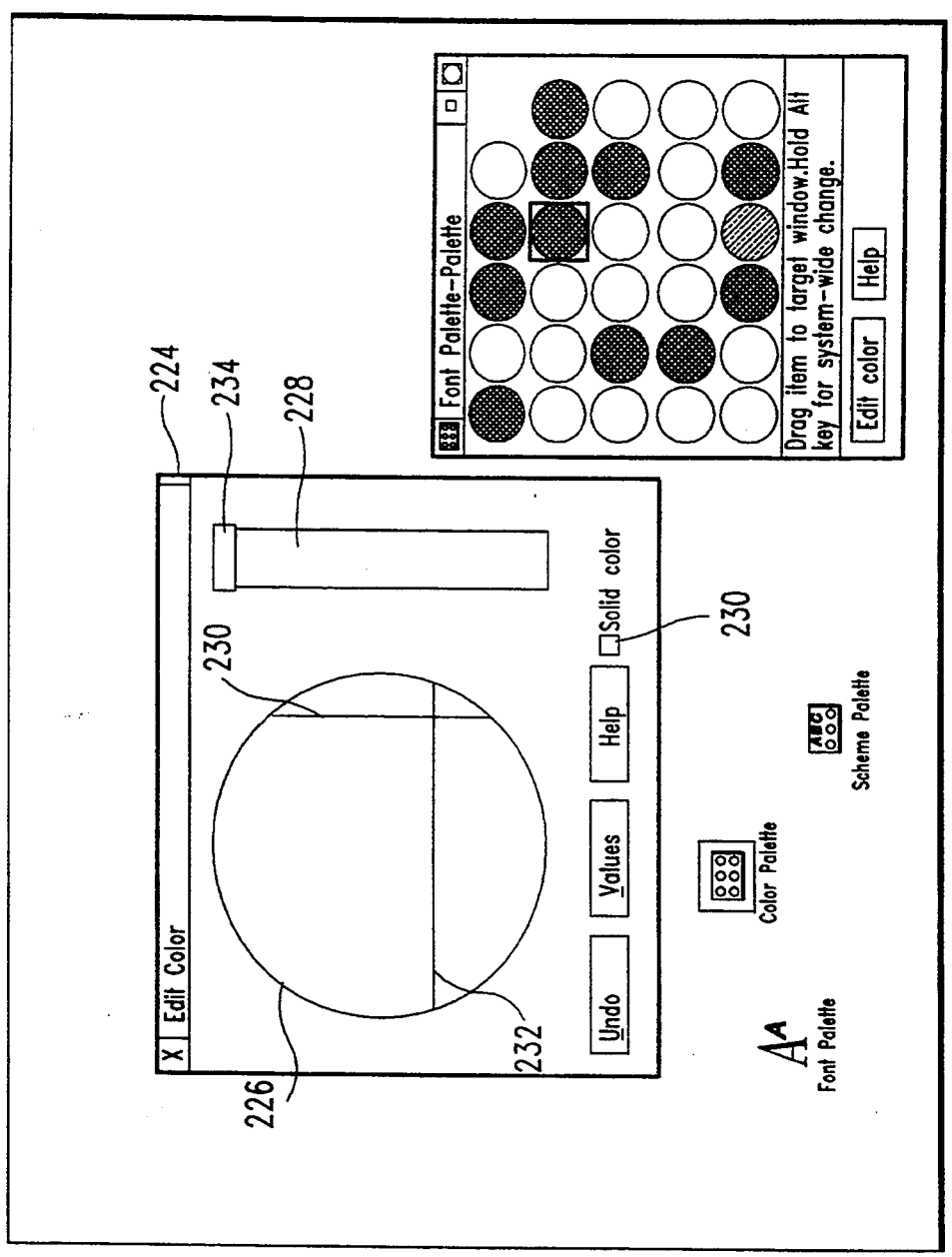

In FIG. 5c, color edit window 224 for the selected color cell is shown. When selected by activating the edit color button, color edit window 224 is displayed with color wheel 226 and color brightness slider 228 corresponding to the color and brightness of the selected cell. Color edit window 224 also includes solid color selector 230 which allows a user to select only solid colors when making color manipulations rather that having gradations of various colors. Color wheel 228 includes a pair of crosshairs 230, 232 which are manipulated to change the color of the selected cell. Color brightness slider 228 includes slider control 234 which is manipulated to change the brightness of the selected cell. Slider control 234 also functions as a color sample; when the color is edited, the edited color is displayed in the slider control box.

Figure 5D:
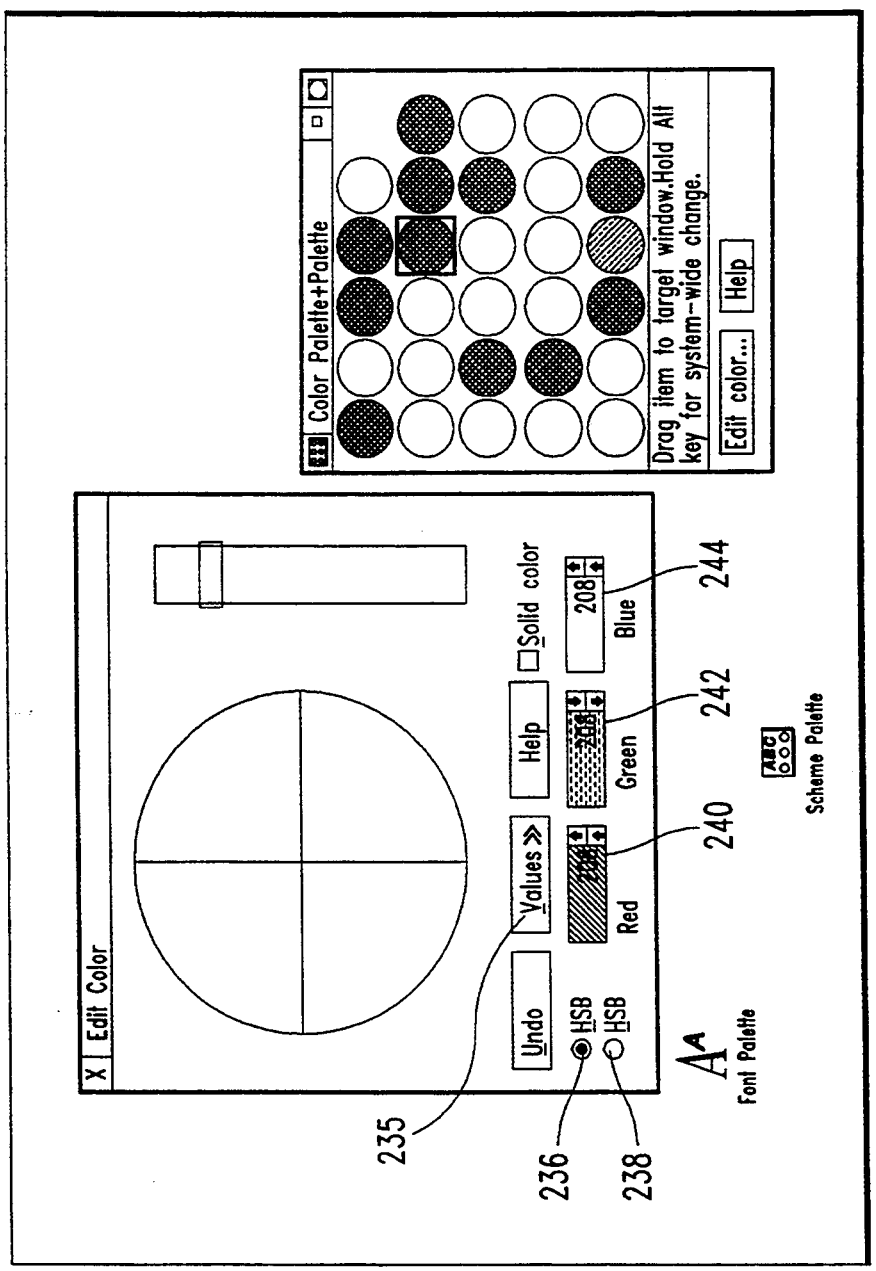

In FIG. 5d, color edit window 224 is shown with the color values altered. As the color values are altered, the color as displayed in the slider control box is dynamically updated. Additionally, the color displayed in the selected cell of color palette window 220 is also dynamically updated. In addition to color wheel 226 and brightness slider 228, color edit window 224 also includes value controls which may be selected by activating "values" button 235 of color edit window 224.

The value controls include control buttons 236, 238 which select between a red, green, blue (RGB) scale and a hue, saturation, brightness (HSB) scale, respectively, as well as fields 240, 242, 244 which correspond to either red, green and blue or hue, saturation and brightness, respectively. Each field is represented by a number between 0 and 255 which corresponds to the amount of the field's characteristic which is included in the selected cell. For example, if the Red field was represented by the number 0, then there is no red in the color corresponding to the selected color. If the Red field was represented by the number 255, then there is the maximum amount of red possible in the selected color. Accordingly, in addition to using color wheel 226 and brightness slider 228, a user may adjust the color of the selected cell using the value fields. The fields may be adjusted using either the arrows corresponding to each field or by entering a number in the field corresponding to the intensity of the field.

Referring to FIGS. 6a–6d, examples of the scheme palette manager are shown. The scheme palette manager allows any combination of window attributes, including color, font, window background image, and window border widths to be quickly and easily applied using a mouse-only drag and drop action. The scheme palette manager also allows a scheme to be directly applied to individual windows and not restricted to a system global change.

Figure 6A:
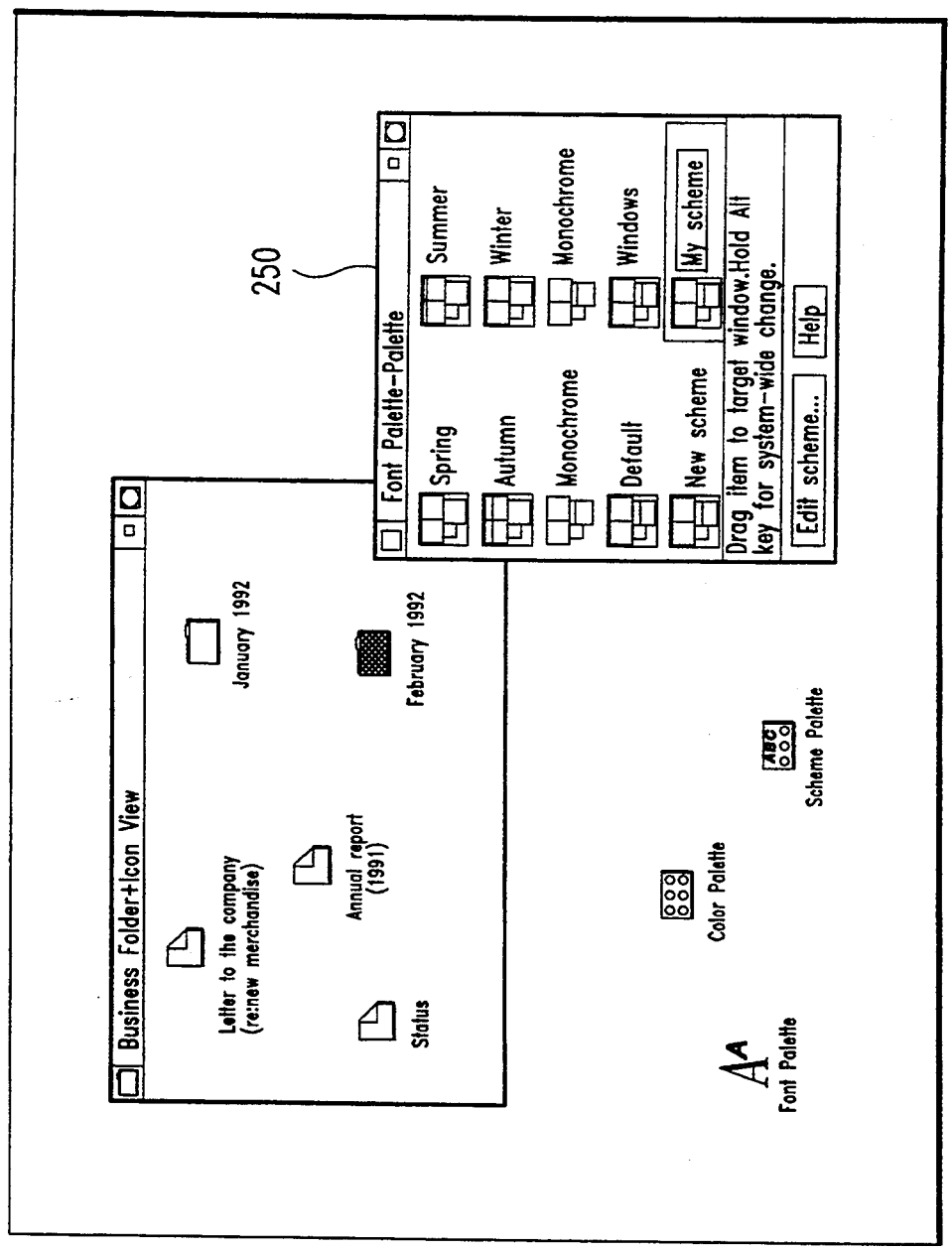
FIGS. 6a–6d are screen representations of a scheme palette in accordance with the present invention.

In FIG. 6a, when scheme palette icon 140 is selected from system setup window 120, an open scheme palette window 250 is displayed. Scheme palette window 250 includes a plurality of cells which are displayed when scheme palette window is open. These cells represent different scheme options, i.e., different scheme values, which may by chosen by a user. The cell entitled "My scheme" is highlighted and thus selected.

Figure 6B:
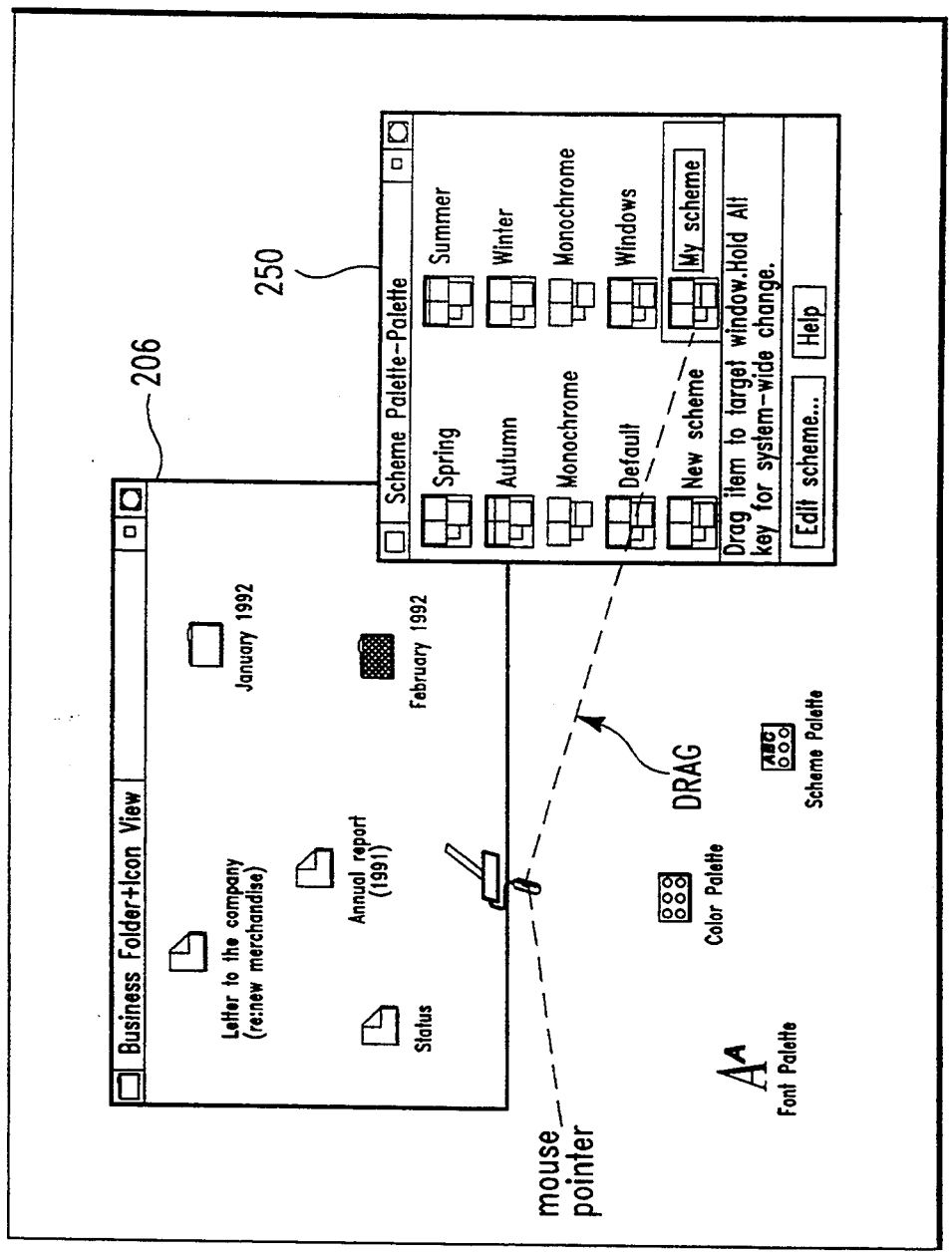

FIG. 6b shows the results of using the scheme palette. Note that the scheme for Business Folder window 206 has changed according to the scheme represented by the "My scheme" value. This change was accomplished when the "My scheme" value was dragged by activating the pointer on this cell. While the drag was in progress, the pointer had the representation of the scheme which was chosen. The scheme value was dropped on Business Folder window 206 by releasing the mouse button while the pointer was positioned over Business Folder window 206. When the mouse button was released, the pointer was restored and the scheme in the target window assumed the value of the "My scheme" cell. More specifically, the folder background changed color, the font of the icon text changed, the title bar text changed to a different font and color, the border width changed, etc. . . .

Figure 6C:
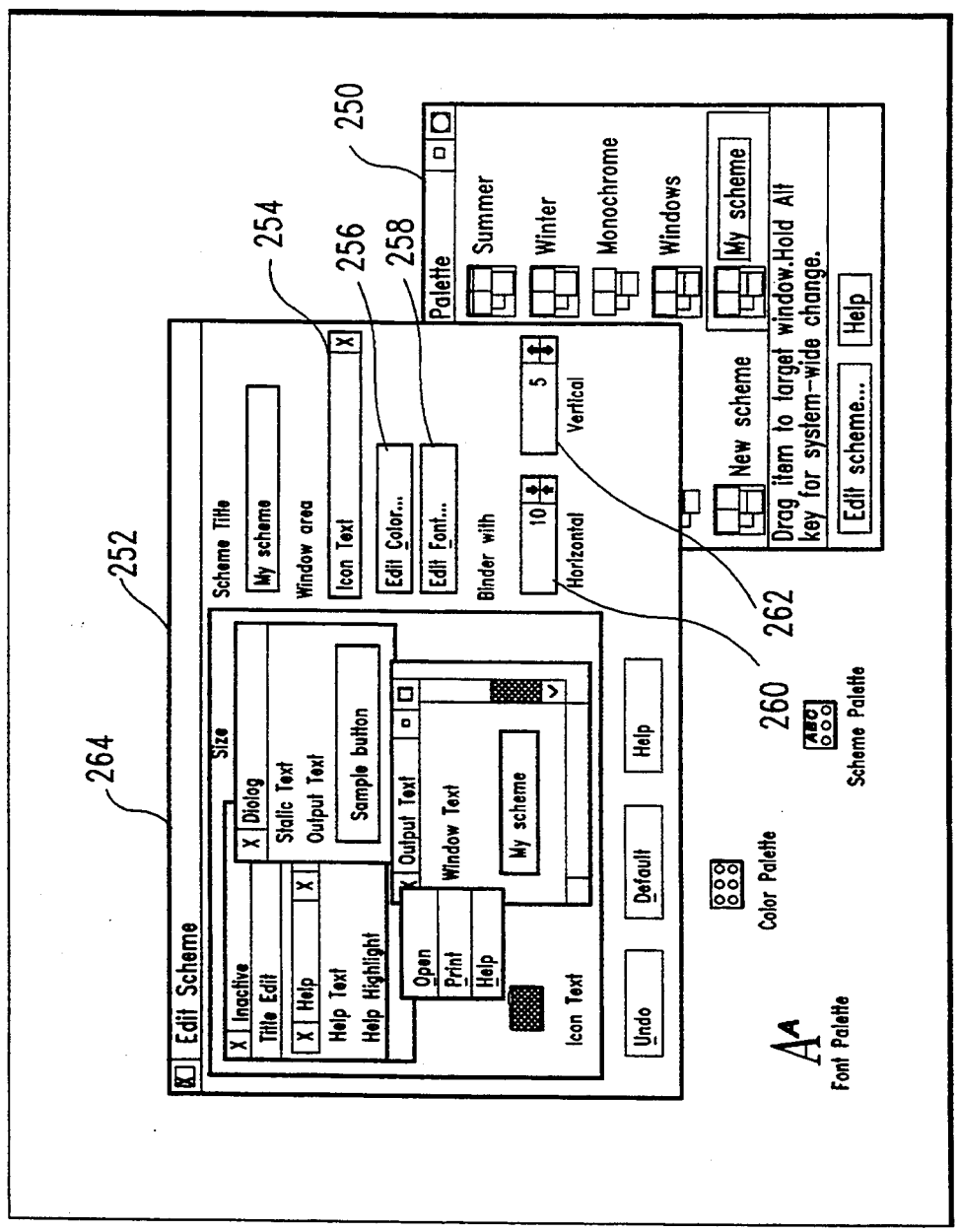

In FIG. 6c, scheme edit window 252 for the selected cell is shown. When selected by activating the edit scheme button, scheme edit window 252 is prefilled with all of the attributes of the scheme value for the selected cell, in this case the "My scheme" cell. Scheme edit window 252 includes window area edit indicator 254 which indicates the window area for which the scheme may be changes. In FIG. 8c, the window area that is selected is "icon text". Edit color and edit font buttons 256, 258 may be used to change the individual component of the window that is selected by window area edit indicator 254. Edit color button 264 calls edit color window 224 to allow individual colors to be manipulated. Edit font button 256 opens edit font window 210 to allow individual fonts to be manipulated. Scheme edit window 252 also includes horizontal and vertical border width fields 260, 262 which allow the horizontal and vertical borders of windows to be manipulated. In addition to the manipulation controls of scheme edit window 252, scheme edit window 252 also includes scheme sample 264 which displays all of the different parameters which may be manipulated.

Figure 6D:
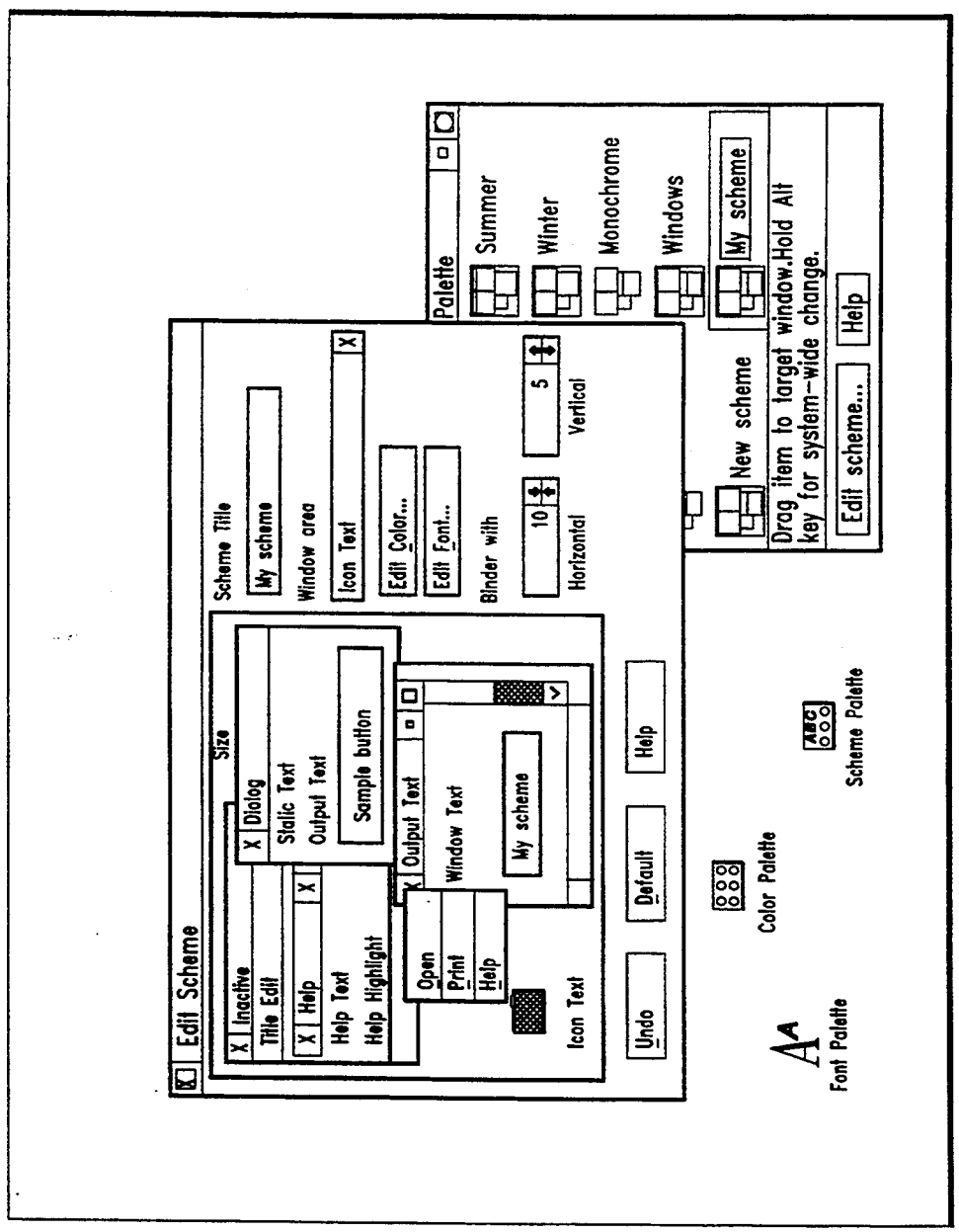

FIG. 6d shows scheme edit window 252 in which scheme values were altered. As the values were altered, the updates were dynamically made to scheme sample 264 as well as the selected cell in scheme palette window 250.

Figure 7:
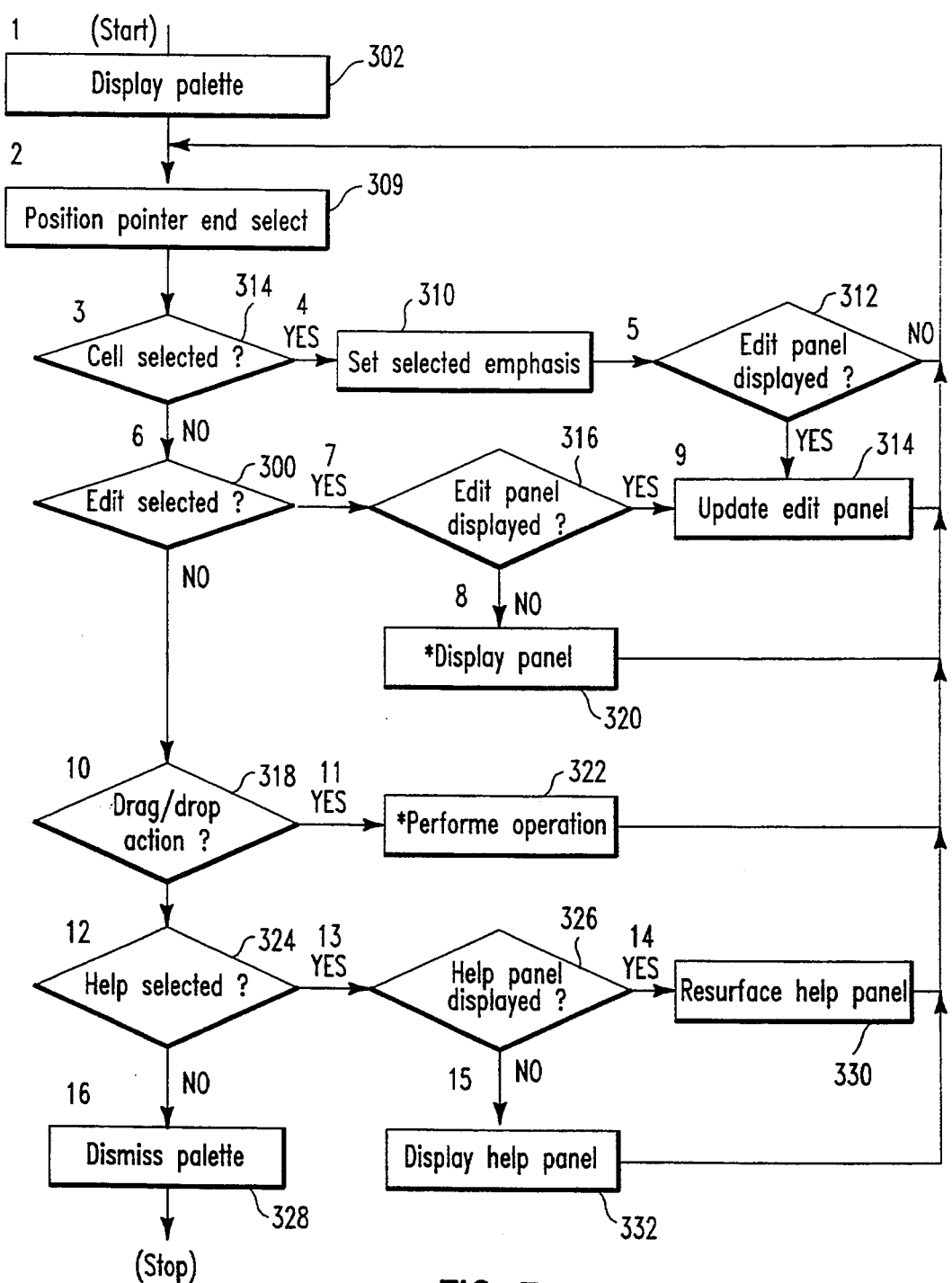
FIG. 7 is a flowchart depicting the operation of the palette manager of the present invention.

Referring to FIG. 7, a palette manager operation is initiated by selecting one of the palette manager icons. When a palette icon is activated, a palette window is opened at step 302. The palette window contains a plurality of cells arranged in rows and columns. Each cell contains a value and is displayed in type-specific format. For example, the cells of the color palette are displayed in the color corresponding to the value of the cell; the cells of the font palette are displayed as a text string having the font type, style name and point size corresponding to the value of the cell; and, the cells of the scheme palette are displayed as a template of window components having window component colors corresponding to the value of the cell. After a palette window is opened, the pointer is positioned over an item and the item is selected at position pointer and select step 304.

An item is selected either by clicking with a mouse button or by using a keyboard action of either enter or a directional cursor key. A cell can be selected by a single click or by moving the selection emphasis using one of the cursor keys. A cell can be edited by double-clicking on the cell, pressing enter while the cell is selected or pressing the edit pushbutton while the cell is selected. Help can be accessed in a conventional manner. The palette window can be closed in the conventional manner.

When an item is selected, then at cell selected step 306, the selection is reviewed to determine if a cell has been selected. If a cell has not been selected, then processing progresses to edit selected step 308 to process the mouse or keyboard event. If a cell has been selected, then processing progresses to set selected emphasis step 310.

At set selected emphasis step 310, a cell within a palette window has been selected. To emphasize the selected state, the cell is highlighted and the highlight of any previously selected cell is removed. Processing continues with edit panel displayed step 312.

At edit panel displayed step 312, if a cell edit window is currently displayed, then processing continues with update edit panel step 314, otherwise, control returns to position pointer and select step 304.

At update edit panel 314, because a value edit window is displayed, the settings of the different parameters within the edit window are updated to reflect the parameters of the newly selected cell. Control then returns to position pointer and select step 304.

When control passes to edit selected step 308, the edit of a value within a cell is initiated by a mouse or keyboard action. If the edit function was requested, processing continues with edit panel displayed step 316, otherwise, processing continues with drag/drop action step 318 to process the mouse or keyboard event.

At edit panel displayed step 316, if a cell edit window is currently displayed, then processing continues with update edit panel step 314, otherwise, control passes to display edit panel step 320.

At display edit panel step 320, a window is displayed which enables a user to change the parameters of the value of the specified cell. The description of FIG. 11 below provides more detail of the edit function.

At drag/drop action step 318, if button 2 of the mouse is pressed and held while the pointer is over a cell and the pointer is moved, then a drag operation is started. When button 2 of the mouse is released after the drag operation has been started, then a drop operation is started. If the event is a drag or drop operation then control passes to perform operation step 322, otherwise, control passes to help selected step 324 to process the mouse or keyboard event.

At perform operation step 322, either the value of the cell will be changed or the value of the cell will be applied to one or more graphical components in the system. The description of FIG. 10 below provides more detail of the drag/drop operation.

At help selected step 324, help is requested by pressing the help button or by pressing the F1 function key on keyboard 16. If help is requested, processing continues with help panel displayed step 326, otherwise control passes to dismiss palette step 328 to process the mouse or keyboard event.

At help panel displayed step 326, if a help window is currently displayed, control passes to resurface help panel step 330, which makes the displayed help window the active window, otherwise control passes to display help panel step 332, which displays a window providing help information. The operation and display of the help window is in accordance with the present state of the art.

At dismiss palette step 328, a request was made to close the palette window. Accordingly, the palette window is dismissed, i.e., is removed from view.

Figure 8:
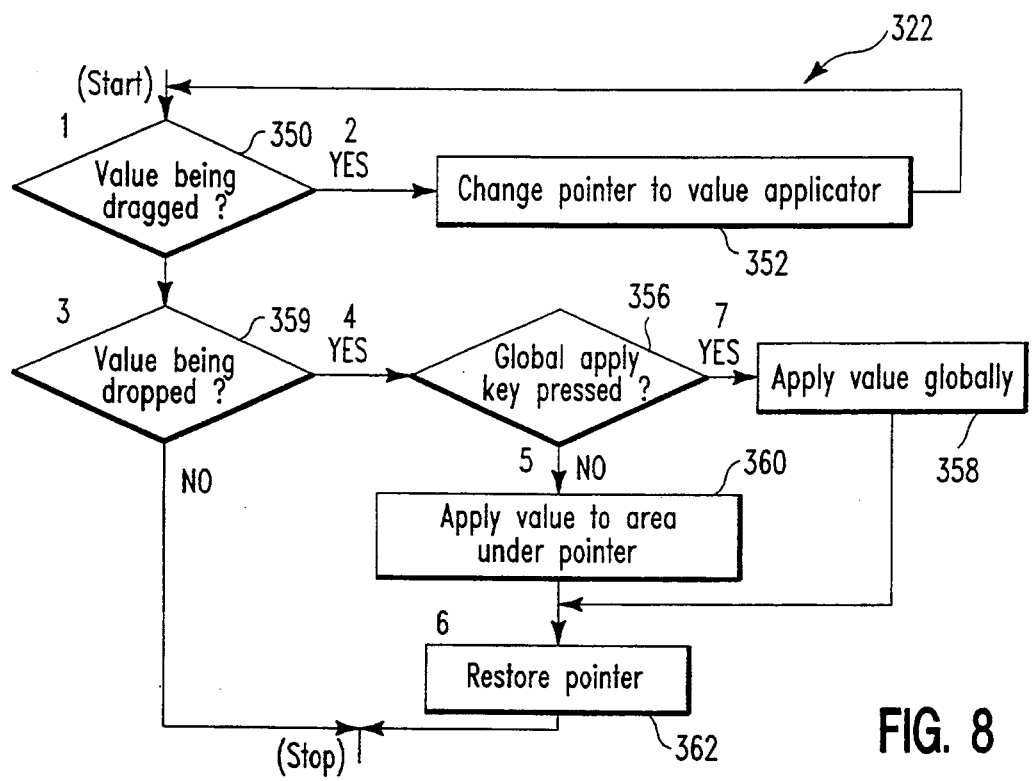
FIG. 8 is a flowchart depicting a drag/drop operation of the palette manager of the present invention.
Figure 9:
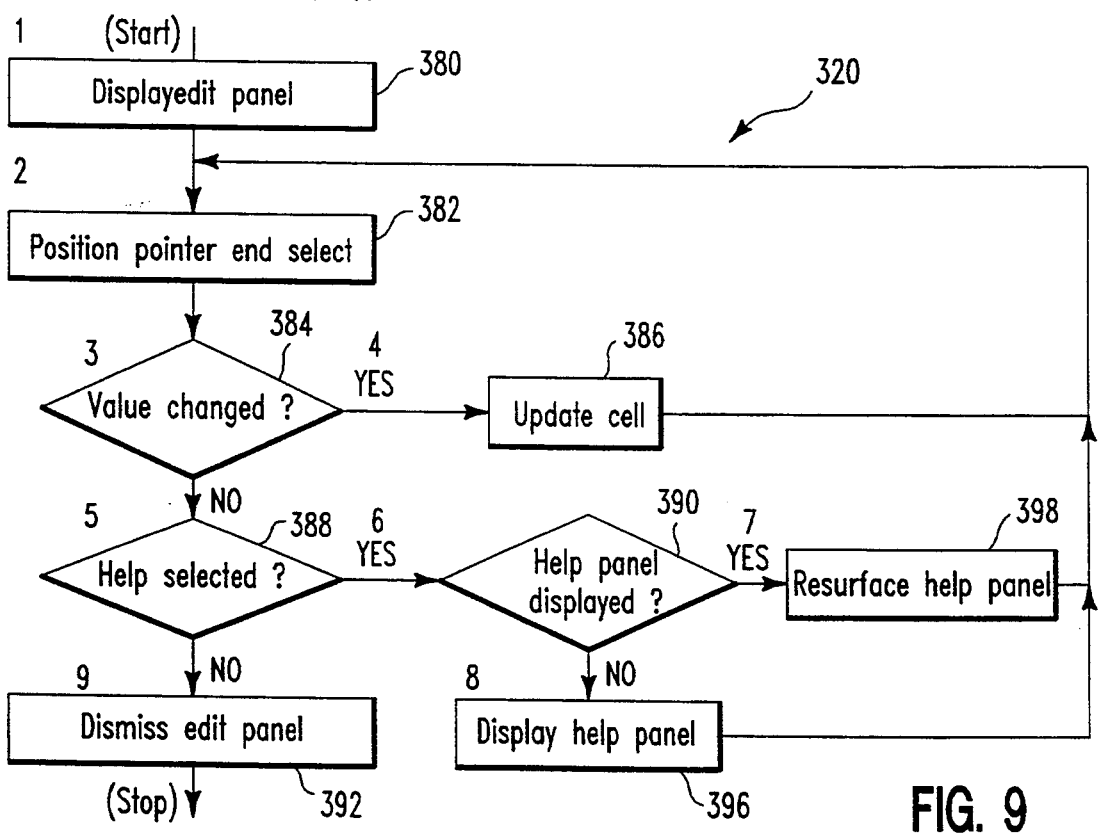
FIG. 9 is a flowchart depicting an edit operation of the palette manager of the present invention.

Referring to FIG. 8, a more detailed view of perform operation step 322 of FIG. 9 is shown. When the perform operation step is activated, the operation is first reviewed at value being dragged step 350 to determine whether a value is being dragged. If button 2 of the mouse is pressed and held while the pointer is over a cell and the pointer is moved, then a drag operation is started. The drag operation continues until either the mouse button is released or the escape key is pressed. If the event is a drag operation, processing proceeds to change pointer step 352, otherwise control passes to value being dropped step 354.

At change pointer step 352, the mouse pointer which is being displayed is changed to a graphical representation of an instrument which applies the value of the cell being dragged, i.e., the pointer is changed to an applicator pointer. For example, the arrow is changed to a pencil to indicate a font value or a paint roller to indicate a color value. If the pointer has already been changed to the applicator pointer, this step is ignored. If the area under the pointer cannot accept the value of the cell being dragged, a no-drop symbol is displayed over the pointer. After the applicator pointer is displayed, control returns to value being dragged step 350.

At value being dropped step 354, if button 2 of the mouse is released after a drag operation has been started, then a drop operation is started. If the event is a drop operation, processing proceeds to global apply key pressed step 356, otherwise the operation has been cancelled and thus completed, and control returns to the palette manager.

At global apply key pressed step 356, the system determines whether a system defined global apply key is pressed. The global apply key specifies that the dropped cell value be applied to a global domain as compared to the local area under the mouse pointer where the drop occurred. If the global apply key is pressed, then control passes to apply value globally step 358, otherwise control passes to apply value to area under pointer step 360.

At apply value to area under pointer step 360, the value of the cell being dragged is applied locally to the area under the pointer when the mouse button is released. For example, if a color is dropped, the local area under the pointer, e.g., a window background, title bar or pushbutton, is changed to the color of the value being dropped. In the local apply case, different components of the same window can take on different values. For example, a window may have four pushbuttons, each having a different color. If the target of the drop is a cell within a palette, that cell can take on the value being dropped. Optionally, a blending augmentation key can be pressed to cause the value of the source to be blended with the value of the target. For example, dragging a yellow value from a cell in a color palette and dropping it with the blending key pressed on a window background which is blue, results in a green window background. After the value of the cell is applied, control passes to restore pointer step 362.

At apply value globally step 358, the value of the cell being dragged is applied globally to the areas of the same type as that under the pointer when the mouse button is released. Global domains are typically application defined and typically imply that a system or application default value is being set. For example, if a color is dropped on a window background while the global apply key is pressed, all window backgrounds are changed to the color of the value being dropped. All new windows that are created also take on this value. If the target of the global apply drop is a cell within a palette, all cells in that palette take on the value being dropped.

Referring to FIG. 9, when control is passed to display edit panel 320, control first proceeds to display edit panel step 380. When edit is selected, a value-specific editor window is displayed. When the edit window is displayed, it is set to the same value as that of the selected cell. Control passes from display edit panel step 380 to position pointer and select step 382.

At position pointer and select step 382, an item is selected by clicking with mouse button 1 or by using a keyboard action. Specific actions are edit window specific, but all value editors provide the same basic function of displaying the current value, changing the value, cancelling the request to change the value and undoing the change. Some value editors can provide additional value specific functions. For example, the color editor lets a user click select a value from a color wheel or by specifying RGB or HSB values. Some value editors can incorporate other value editors. The scheme editor, for example, provides access to the color editor and the font editor. After an item is selected, control passes to value changed step 384.

At value changed step 384, the system determines whether a mouse or keyboard action has been performed. If the action altered a value of the cell control passes to update cell step 386, otherwise control passes to help selected step 388.

At update cell step 386, the value editor updates the visual display in the editor as well as updating the value in the selected cell itself. After the value is updated, control returns to Position pointer and select step 382.

At help selected step 388, help is requested by pressing the help button or by pressing the F1 function key on keyboard 16. If help is requested, processing continues with help panel displayed step 390, otherwise control passes to dismiss edit panel step 392 to process the mouse or keyboard event.

At help panel displayed step 390, if a help window is currently displayed, control passes to resurface help panel step 394, which makes the displayed help window the active window and returns control to position pointer and select step 382, otherwise control passes to display help panel step 396, which displays a window providing help information. The operation and display of the help window is in accordance with the present state of the art.

At dismiss edit panel step 392, a request was made to close the edit panel. Accordingly, the edit panel is dismissed, i.e., is removed from view and control returns to the palette manager.

OTHER EMBODIMENTS

Other embodiments are within the following claims.

For example, while the preferred embodiment is set forth in computer software, the system that is set forth can be implemented in hardware. In such an embodiment, the palette manager and other operating system modules correspond to circuitry rather than computer software.

What is claimed is:

1. For a computer operating system having a graphical user interface, wherein objects are displayed to users of said computer operating system in multiple windows having discretely separate boundaries, and wherein said users can manipulate appearance attributes of said multiple windows and of objects viewed in said multiple windows by means of a pointer, a method for enabling said users to adjust appearance attributes on a non-global basis (non-global meaning affecting less than all of the windows displayable to said users) of selected said multiple windows and/or selected objects viewed in said selected windows, said method comprising providing said computer operating system with a palette manager having an associated palette manager window that displays a plurality of appearance attribute functions that are individually selectable by means of said pointer, selecting one of said appearance attribute functions in said associated palette manager window via said pointer, dragging a graphic representation of said selected one of said appearance attribute functions to a selected point outside the boundary of said palette manager window, and performing a dropping action at said selected point for effecting a non-global change in a said appearance attribute in a window containing said selected point; said window containing said selected point being discretely separate from said associated palette manager window; said appearance change effected in said window containing said selected point corresponding to said selected appearance attribute function.

2. The method of claim 1 wherein said appearance attribute functions relate to colors.

3. The method of claim 1 wherein said appearance attribute functions relate to fonts.

4. The method of claim 1 wherein said appearance attribute functions relate to schemes associated with selected combinations of plural appearance attribute functions.

5. For a computer operating system having a graphical user interface, wherein objects are displayed to users of said computer operating system in multiple windows having discretely separate boundaries, and wherein said users can manipulate appearance attributes of objects viewed in said multiple windows by means of a pointer, a method for enabling said users to alter said appearance attributes in a non-global manner (wherein non-global meaning in a manner affecting appearances of less than all of the windows displayable to said users), said method comprising providing said computer operating system with a plurality of palette managers, each palette manager having an associated window for displaying to said users a plurality of appearance attribute functions selectable by means of said pointer, said palette managers being represented on a display device by icons and respective associated windows of said palette managers being accessible through selection of respective icons via said pointer, activating one of said palette managers via said pointer to display the window associated with said activated palette manager, selecting one of said appearance attribute functions in said associated window of sad activated palette manager window via said pointer, dragging a graphic representation of said selected appearance attribute function to a selected point outside the boundary of said associated window of said activated palette manager, said point being contained in a window discretely separate from said associated window of said activated palette manager, and dragging said graphic representation of said selected appearance attribute function at said selected point to cause a non-global change in appearance in a part of said discretely separate window, said non-global change in appearance corresponding to said selected appearance attribute function.

6. The method of claim 5 wherein said plurality of palette managers include a font palette manager and said appearance attribute functions relate to appearances of text character symbols displayed in said discretely separate window.

7. The method of claim 5 wherein said plurality of palette managers include a color palette manager and said appearance attribute functions relate to colors shown in parts of said discretely separate window and of objects viewed in said discretely separate window.

8. The method of claim 5 wherein said plurality of palette managers include a scheme palette manager and each said appearance attribute function relates to a scheme potentially affecting plural appearance attributes of said discretely separate window.

* * * * *